(12) United States Patent
Hernandez et al.

(10) Patent No.: US 11,897,783 B2
(45) Date of Patent: Feb. 13, 2024

(54) POROUS ALUMINUM HYDRATE

(71) Applicant: RHODIA OPERATIONS, Aubervilliers (FR)

(72) Inventors: Julien Hernandez, Antony (FR); Olivier Larcher, Perigny (FR)

(73) Assignee: RHODIA OPERATIONS, Lyons (FR)

( * ) Notice: Subject to any disclaimer, the term of this patent is extended or adjusted under 35 U.S.C. 154(b) by 699 days.

(21) Appl. No.: 16/772,621

(22) PCT Filed: Dec. 18, 2018

(86) PCT No.: PCT/FR2018/053377
§ 371 (c)(1),
(2) Date: Jun. 12, 2020

(87) PCT Pub. No.: WO2019/122692
PCT Pub. Date: Jun. 27, 2019

(65) Prior Publication Data
US 2021/0070623 A1    Mar. 11, 2021

(30) Foreign Application Priority Data
Dec. 22, 2017 (FR) ...................................... 1762940

(51) Int. Cl.
*C01F 7/441* (2022.01)
*C01F 7/34* (2006.01)

(52) U.S. Cl.
CPC ................ *C01F 7/441* (2013.01); *C01F 7/34* (2013.01); *C01P 2002/54* (2013.01); *C01P 2002/60* (2013.01); *C01P 2002/72* (2013.01); *C01P 2006/13* (2013.01); *C01P 2006/14* (2013.01); *C01P 2006/16* (2013.01)

(58) Field of Classification Search
CPC .. C01F 7/441; C01F 7/34; C01F 17/30; C01F 7/02; C01P 2002/54; C01P 2002/60; C01P 2002/72; C01P 2006/13; C01P 2006/14; C01P 2006/16; C01P 2002/02; C01P 2002/50; C01P 2002/52; C01P 2006/12; C01P 2006/17; C01P 2006/80; C01P 2006/021; C01G 25/006; C01G 25/00; B01J 21/04; B01J 23/002; B01J 23/10
See application file for complete search history.

(56) References Cited

U.S. PATENT DOCUMENTS

| | | | | |
|---|---|---|---|---|
| 4,154,812 A | * | 5/1979 | Sanchez | B01J 21/04 423/628 |
| 4,301,037 A | * | 11/1981 | Sanchez | C01F 7/025 423/628 |
| 2009/0023581 A1 | * | 1/2009 | Di Monte | C01F 7/168 502/355 |
| 2011/0257008 A1 | * | 10/2011 | Bartholomew | C01G 25/02 423/592.1 |

(Continued)

*Primary Examiner* — Anthony J Zimmer
*Assistant Examiner* — Jordan W Taylor
(74) *Attorney, Agent, or Firm* — Osha Bergman Watanabe & Burton LLP (57) ABSTRACT

The present invention relates to a porous aluminum hydrate, to a process for preparing same and to the use of same as intermediate in the preparation of an alumina or of a mixed oxide based on aluminum, on cerium and on zirconium. The invention also relates to the alumina obtained from the aluminum hydrate.

20 Claims, 3 Drawing Sheets

(56) References Cited

U.S. PATENT DOCUMENTS

| | | | |
|---|---|---|---|
| 2012/0122670 A1* | 5/2012 | Polli | B01J 37/04 |
| | | | 502/263 |
| 2012/0122671 A1* | 5/2012 | Polli | B01J 37/0045 |
| | | | 502/355 |
| 2018/0208478 A1* | 7/2018 | Rabaioli | C01F 7/14 |

* cited by examiner

POROUS ALUMINUM HYDRATE

The present application is a U.S. national stage entry under 35 U.S.C. § 371 of International Application No. PCT/FR2018/053377, filed on Dec. 18, 2017, which claims the priority of the French patent application No. 1 762 940 filed on Dec. 22, 2017. The entire contents of these applications are explicitly incorporated herein in full by reference. In case of inconsistency between the text of the present application and the text of the French priority patent application which would affect the clarity of a term or of an expression, reference shall be made solely to the International Application.

TECHNICAL FIELD

The present invention relates to a porous aluminum hydrate, to a process for preparing same and to the use of same as intermediate in the preparation of an alumina or of a mixed oxide based on aluminum, on cerium, on zirconium, on lanthanum and optionally on at least one rare-earth metal (REM) other than cerium and lanthanum. The invention also relates to the alumina obtained from the aluminum hydrate.

Technical Problem

Aluminum hydrates are used for the preparation of catalysts or catalyst supports. The preparation usually consists in shaping the aluminum hydrate, then calcining it to transform it into alumina. The properties of the aluminum hydrate influence the characteristics of the alumina obtained and, consequently, the application properties of the catalysts and catalyst supports. In the case of the preparation of an alumina having a high specific surface area, the aluminum hydrate is generally boehmite.

The mixed oxides based on aluminum, on cerium and/or on zirconium may be obtained by processes in which the aluminum is provided in the form of an aluminum hydrate. It is necessary for the aluminum hydrate to be highly dispersible in the reaction mixture of these processes so as to obtain a mixed oxide having good properties, in particular a high thermal resistance.

The applicant has developed a particular aluminum hydrate which aims to solve this technical problem.

BRIEF DESCRIPTION OF THE INVENTION

The invention relates to an aluminum hydrate based on a boehmite, which may optionally comprise at least one additional element selected from the group formed by lanthanum, praseodymium or a mixture of the two elements, characterized in that, after having been calcined in air at a temperature of 900° C. for 2 h, it has:
- a pore volume in the domain of the pores having a size of less than or equal to 20 nm (denoted by $VP_{20\ nm}\text{-}N_2$) such that $VP_{20\ nm}\text{-}N_2$:
  - is greater than or equal to $10\% \times VPT\text{-}N_2$, more particularly greater than or equal to $15\% \times VPT\text{-}N_2$, or even greater than or equal to $20\% \times VPT\text{-}N_2$, or even greater than or equal to $30\% \times VPT\text{-}N_2$;
  - is less than or equal to $60\% \times VPT\text{-}N_2$;
- a pore volume in the domain of the pores having a size of between 40 and 100 nm (denoted by $VP_{40\text{-}100\ nm}\text{-}N_2$) such that $VP_{40\text{-}100\ nm}\text{-}N_2$ is greater than or equal to $20\% \times VPT\text{-}N_2$, more particularly greater than or equal to $25\% \times VPT\text{-}N_2$, or even greater than or equal to $30\% \times VPT\text{-}N_2$;

$VPT\text{-}N_2$ denoting the total pore volume of the aluminum hydrate after calcination in air at 900° C. for 2 h;

the pore volumes being determined by the nitrogen porosimetry technique.

The invention also relates to the process for obtaining this aluminum hydrate, comprising the following steps:

(a) the following are introduced into a stirred tank containing an aqueous nitric acid solution:
- an aqueous solution (A) comprising aluminum sulfate, optionally the additional element(s) in nitrate form, and nitric acid;
- an aqueous sodium aluminate solution (B);

the aqueous solution (A) being introduced continuously throughout step (a) and the flow rate of introduction of the solution (B) being regulated so that the mean pH of the reaction mixture is equal to a target value of between 4.0 and 6.0, more particularly of between 4.5 and 5.5;

(b) when the entire aqueous solution (A) has been introduced, the aqueous solution (B) continues to be introduced until a target pH of between 8.0 and 10.5, preferably of between 9.0 and 10.0, is reached;

(c) the reaction mixture is then filtered and the solid recovered is washed with water;

(d) the solid resulting from step (c) is then dried.

The invention also relates to the use of the hydrate to prepare an alumina and also to the use of the aluminum hydrate in the preparation of a mixed oxide based on aluminum, on cerium, on zirconium, on lanthanum and optionally on at least one rare-earth metal (REM) other than cerium and lanthanum.

Technical Background

WO 2006/119549 and WO 2013007242 describe processes for preparing mixed oxides based on aluminum, on cerium and on zirconium, in which the source of aluminum is a solid aluminum-based compound.

EP 1 098 848 describes a different boehmite.

DETAILED DESCRIPTION

Figure 1:
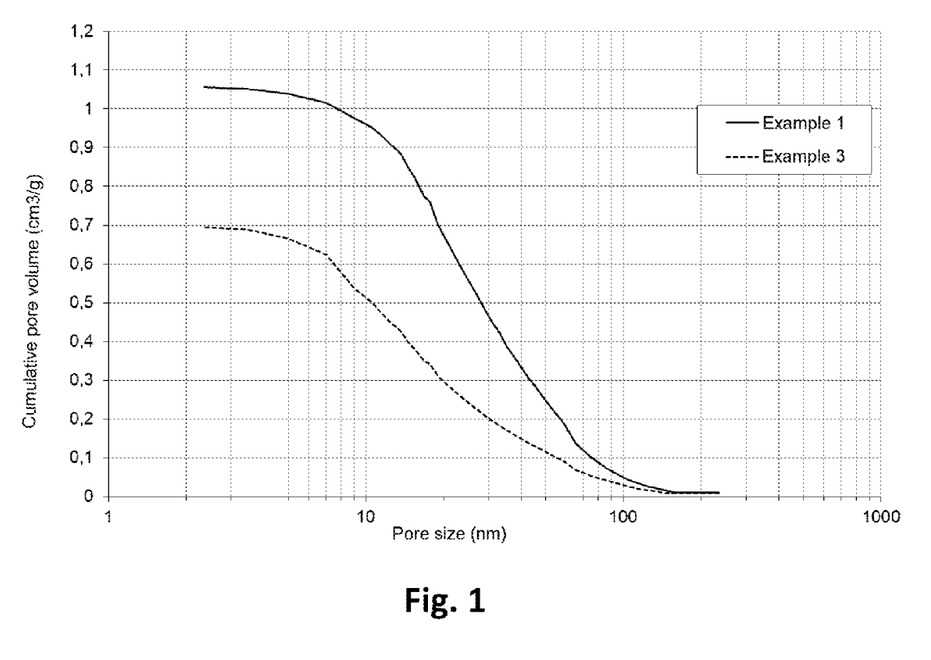
FIG. 1 represents the cumulative pore volume obtained by nitrogen porosimetry for the aluminum hydrates of examples 1 and 3.
Figure 2:
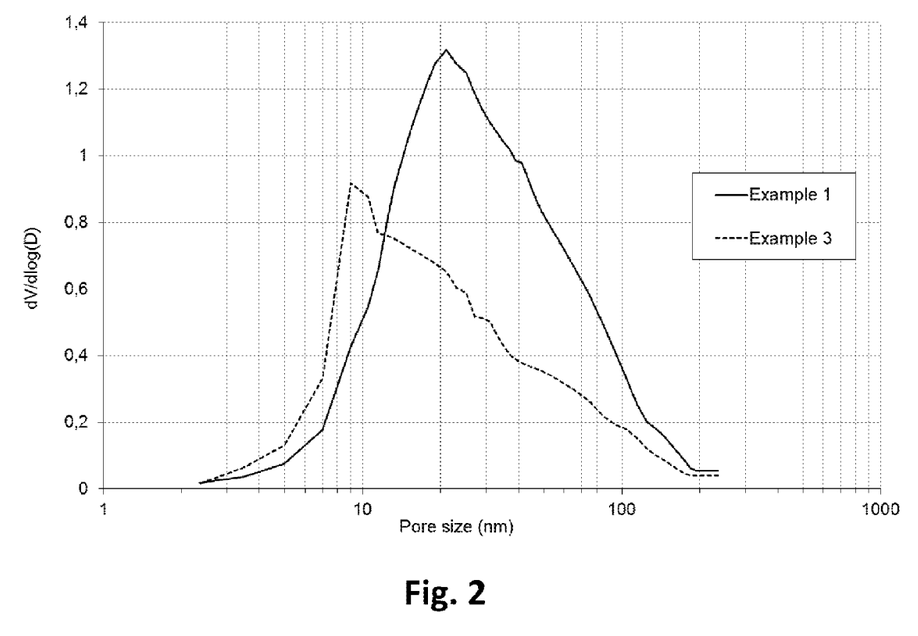
FIG. 2 represents the pore distribution by nitrogen porosimetry of the aluminum hydrates of examples 1 and 3. The porogram in this figure represents the derivative (dV/d log D) as a function of D (V: pore volume; D: pore size).
Figure 3:
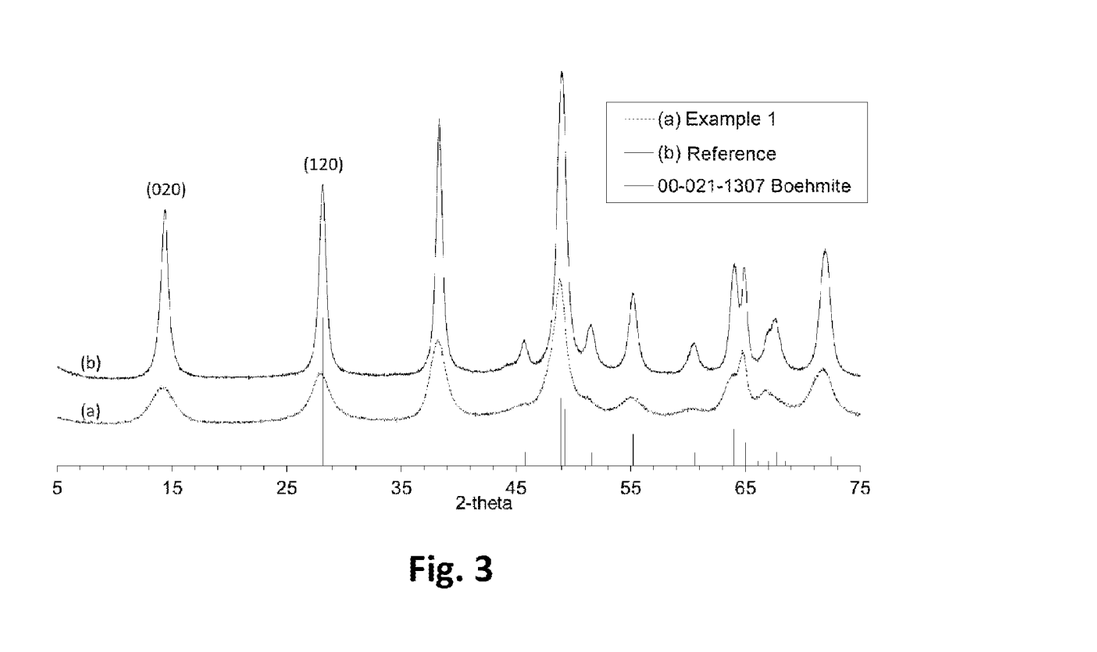
FIG. 3 represents the X-ray diffractogram of the aluminum hydrate of example 1 and of the reference (product corresponding to example B1 of application US 2013/017947). The peaks for boehmite from the file JCPDS 00-021-1307 are also given by way of indication in this figure.

The invention relates to an aluminum hydrate based on boehmite which has a particular porosity (described hereinbelow). The term "boehmite" denotes, in European nomenclature and as is known, the gamma oxyhydroxide (γ-AlOOH). In the present application, the term "boehmite" denotes a variety of aluminum hydrate having a particular crystalline form which is known to a person skilled in the art. Boehmite may thus be characterized by X-ray diffraction. The term "boehmite" also covers "pseudoboehmite" which, according to certain authors, only resembles a particular variety of boehmite and which simply has a broadening of the characteristic peaks of boehmite.

Boehmite is identified by X-ray diffraction through its characteristic peaks. These are given in the file JCPDS 00-021-1307 (JCPDS=Joint Committee on Powder Diffraction Standards). It will be noted that the apex of the peak (020) may be between 13.0° and 15.0° depending in particular on:

the degree of crystallinity of the boehmite;
the size of the crystallites of the boehmite.

Reference may be made to *Journal of Colloidal and Interface Science*, 2002, 253, 308-314 or to *J. Mater. Chem.*, 1999, 9, 549-553 in which it is described, for a certain number of boehmites, that the position of the peak varies depending on the number of layers in the crystal or on the size of the crystallites. This apex may more particularly be between 13.5° and 14.5°, or between 13.5° and 14.485°.

The aluminum hydrate may optionally comprise at least one additional element selected from the group formed by lanthanum, praseodymium or a mixture of these two elements. The aluminum hydrate may therefore comprise La or Pr or else La+Pr. The proportion of this element or the total proportion of these elements may be between 0% and 15% by weight, more particularly between 0% and 10% by weight, more particularly still between 0% and 8%. This proportion may be between 2% and 8%. This proportion is given by weight of the element(s) expressed in oxide form relative to the total weight of the elements Al, La and/or Pr, also expressed in oxide form. For the calculation of this proportion, it is considered that the lanthanum oxide is in the form $La_2O_3$, that the praseodymium oxide is in the form $Pr_6O_{11}$ and that the aluminum oxide is in the form $Al_2O_3$. Thus, an aluminum hydrate comprising lanthanum in a proportion of 7% is such that it contains the equivalent of 7% of $La_2O_3$ and the equivalent of 93% of $Al_2O_3$. It is possible to determine the proportion of additional element(s) by calcining the aluminum hydrate in air so as to convert it into alumina and into oxide(s) of the additional element(s), then by attacking the product thus calcined, for example with a concentrated nitric acid solution, so as to dissolve the elements thereof in a solution which may then be analyzed by techniques known to a person skilled in the art, such as for example ICP.

The boehmite contained in the aluminum hydrate may have a mean size of the crystallites of at most 6.0 nm, or even of at most 4.0 nm, more particularly still of at most 3.0 nm. The mean size of the crystallites is determined by the X-ray diffraction technique and corresponds to the size of the coherent domain calculated from the full width at half maximum of the line (020).

For the calculation of the size of the crystallites, use is made of the Debye-Scherrer model, which is utilized in a known manner in X-ray diffraction on powders and which makes it possible to determine the size of the crystallites from the full width at half maximum of the diffraction peaks. For more information, reference may be made to *Appl. Cryst.*, 1978, 11, 102-113, "Scherrer after sixty years: A survey and some new results in the determination of crystallite size, J. I. Langford and A. J. C. Wilson". The formula used is as follows:

$$t = \frac{k \cdot \lambda}{\sqrt{H^2 - s^2} \cdot \cos\theta}$$

t: crystallite size
k: shape factor equal to 0.9
$\lambda$ (lambda): wavelength of the incident beam ($\lambda$=1.5406 angstroms)
H: full width at half maximum of the diffraction line
s: width due to the fault of the instrumental optics which depends on the instrument used and on the $2\theta$ (theta) angle
$\theta$: Bragg angle The aluminum hydrate of the invention may be in the form of a mixture of a boehmite, identifiable as was described above by the X-ray diffraction technique, and of a phase which is not visible in X-ray diffraction, in particular an amorphous phase.

The aluminum hydrate may have a percentage of crystalline phase (boehmite) which is less than or equal to 60%, more particularly less than or equal to 50%. This percentage may be between 40% and 55%, or between 45% and 55%, or between 45% and 50%. This percentage is determined in a manner known to a person skilled in the art. It is possible to use the following formula to determine this percentage: percentage of crystallinity=intensity of the peak (120)/intensity of the peak (120) of the reference×100, in which the intensity of the peak (120) of the aluminum hydrate and the intensity of the peak (120) of a reference are compared. The reference used in the present application is the product corresponding to example B1 of application US 2013/017947. The intensities measured correspond to the surface areas of the peaks (120) above the baseline. These intensities are determined on the diffractograms relative to a baseline taken over the $2\theta$ angle range between 5.0° and 90.0°. The baseline is determined automatically using the software for analyzing the data of the diffractogram.

The aluminum hydrate has a particular porosity. Thus, after calcination in air at 900° C. for 2 hours, the aluminum hydrate has a pore volume in the domain of the pores having a size of less than or equal to 20 nm (denoted by $VP_{20\ nm}\text{-}N_2$) such that $VP_{20\ nm}\text{-}N_2$ is greater than or equal to 20%×VPT-$N_2$, more particularly greater than or equal to 25%×VPT-$N_2$, or even greater than or equal to 30%×VPT-$N_2$. Furthermore, $VP_{20\ nm}\text{-}N_2$ is less than or equal to 60%×VPT-$N_2$.

Furthermore, after calcination in air at 900° C. for 2 hours, the aluminum hydrate has a pore volume in the domain of the pores having a size of between 40 and 100 nm (denoted by $VP_{40\text{-}100\ nm}\text{-}N_2$) such that $VP_{40\text{-}100\ nm}\text{-}N_2$ is greater than or equal to 15%×VPT-$N_2$, more particularly greater than or equal to 20%×VPT-$N_2$, or even greater than or equal to 25%×VPT-$N_2$, or even greater than or equal to 30%×VPT-$N_2$. Furthermore, $VP_{40\text{-}100\ nm}\text{-}N_2$ may be less than or equal to 65%×VPT-$N_2$.

After calcination in air at 900° C. for 2 hours, the aluminum hydrate of the invention may have a total pore volume (VPT-$N_2$) of between 0.65 and 1.20 ml/g, more particularly between 0.70 and 1.15 ml/g, or between 0.70 and 1.10 ml/g. It will be noted that the pore volume thus measured is developed predominantly by the pores of which the diameter is less than or equal to 100 nm.

The aluminum hydrate may have a specific surface area of at least 200 m$^2$/g, more particularly of at least 250 m$^2$/g. This specific surface area may be between 200 and 400 m$^2$/g. Specific surface area is understood to mean the BET specific surface area obtained by nitrogen adsorption. It is the specific surface area as is conventionally understood by a person skilled in the art. This surface area is determined by nitrogen adsorption on a powder according to the known Brunauer-Emmett-Teller method (BET method). This method is described in ASTM D 3663-03 (re-approved 2015). This method is also described in *The Journal of the American Chemical Society*, 60, 309 (1938).

The pore volumes which are given in the present application are determined by the nitrogen porosimetry technique. For the porosity or specific surface area measurements, the samples are pre-treated at high temperature and/or under vacuum in order to eliminate the volatile surface species (such as for example $H_2O$, etc.). Heating at 200° C. for 2 hours may for example be applied to the sample.

Moreover, after calcination in air at 900° C. for 2 hours, the aluminum hydrate may have a (BET) specific surface area of at least 130 $m^2/g$, more particularly of at least 150 $m^2/g$. This specific surface area may be between 130 and 220 $m^2/g$.

After calcination in air at 940° C. for 2 hours, followed by calcination in air at 1100° C. for 3 hours, the aluminum hydrate may have a (BET) specific surface area of at least 80 $m^2/g$, more particularly of at least 100 $m^2/g$. This specific surface area may be between 80 and 120 $m^2/g$.

When the aluminum hydrate comprises at least one additional element as described above, the aluminum hydrate will be able to have a high thermal resistance. Thus, after calcination in air at 940° C. for 2 hours, followed by calcination in air at 1200° C. for 5 hours, the aluminum hydrate may have a (BET) specific surface area of at least 45 $m^2/g$, more particularly of at least 50 $m^2/g$. This specific surface area may be between 45 and 75 $m^2/g$.

In the present application, the expression "after calcination in air at the temperature x° C. for y hours, the aluminum hydrate has" is used to characterize the aluminum hydrate even if the property measured (specific surface area or pore volume) is that of the product resulting from the calcination of the aluminum hydrate.

The aluminum hydrate may comprise residual sulfate. The content of residual sulfate may be less than or equal to 0.50% by weight, or less than or equal to 0.20% by weight. The sulfate content may be greater than or equal to 50 ppm. This content is expressed as weight of sulfate relative to the weight of the oxides of the elements Al and optionally of the additional element(s). Thus, a content of residual sulfate of 0.5% corresponds to 0.5 g of $SO_4$ per 100 g of oxides ($Al_2O_3$, $Pr_6O_{11}$, $La_2O_3$). The method for determining the sulfate content within this range of concentrations is known to a person skilled in the art. For example, it is possible to use the microanalysis technique. A microanalysis device of Horiba EMIA 320-V2 type may thus be used.

The aluminum hydrate may comprise residual sodium. The content of residual sodium may be less than or equal to 0.15% by weight, or less than or equal to 0.10% by weight. The sodium content may be greater than or equal to 50 ppm. This content is expressed as weight of $Na_2O$ relative to the weight of the oxides of the elements Al and optionally of the additional element(s). Thus, a content of residual sodium of 0.15% corresponds to 0.15 g of $Na_2O$ per 100 g of oxides ($Al_2O_3$, $Pr_6O_{11}$, $La_2O_3$). The method for determining the sodium content within this range of concentrations is known to a person skilled in the art. For example, it is possible to use the plasma emission spectroscopy technique.

The aluminum hydrate of the invention is obtained by the process comprising the following steps:
(a) the following are introduced into a stirred tank containing an aqueous nitric acid solution:
an aqueous solution (A) comprising aluminum sulfate, optionally the additional element(s) in nitrate form, and nitric acid;
an aqueous sodium aluminate solution (B);
the aqueous solution (A) being introduced continuously throughout step (a) and the flow rate of introduction of the solution (B) being regulated so that the mean pH of the reaction mixture is equal to a target value of between 4.0 and 6.0, more particularly of between 4.5 and 5.5;
(b) when the entire aqueous solution (A) has been introduced, the aqueous solution (B) continues to be introduced until a target pH of between 8.0 and 10.5, preferably of between 9.0 and 10.0, is reached;
(c) the reaction mixture is then filtered and the solid recovered is washed with water;
(d) the solid resulting from step (c) is then dried to give the hydrate of the invention.

The aqueous solution (A) is obtained from aluminum sulfate and nitric acid. The aqueous solution (A) may also comprise the additional element(s) in nitrate form. The aqueous solution (A) may have a concentration of alumina equivalent of between 1% and 5% by weight.

The aqueous solution (B) is obtained from sodium aluminate. It preferably does not have precipitated alumina. The sodium aluminate preferably has an $Na_2O/Al_2O_3$ ratio of greater than or equal to 1.2, for example of between 1.20 and 1.40.

The aqueous solution (A) is introduced continuously throughout step (a) into the stirred tank. The duration of introduction of the aqueous solution (A) may be between 10 min and 2 h. The aqueous solution (B) is introduced at the same time as the aqueous solution (A) at a flow rate which is regulated so that the mean pH of the reaction mixture is equal to a target value. The target value is between 4.0 and 6.0, more particularly between 4.5 and 5.5. "Mean pH" is understood to mean the arithmetic mean of the pH values recorded continuously during step (a). Since the flow rate of the aqueous solution (B) is regulated, it is possible that at certain moments it is zero, that is to say that it is only the aqueous solution (A) which is being introduced into the stirred tank.

During step (b), when the entire aqueous solution (A) has been introduced into the reactor at the end of step (a), the aqueous solution (B) continues to be introduced until a target pH of between 8.0 and 10.5, preferably of between 9.0 and 10.0, is reached. The duration of step (b) may be variable. This duration may be between 5 min and 2 hours.

The temperature of the aqueous nitric acid solution initially present in the tank may be between 50° C. and 80° C. During step (a), the temperature of the reaction mixture may also be between 50° C. and 80° C. During step (b), the temperature of the reaction mixture may also be between 50° C. and 80° C.

During step (c), the reaction mixture (in the form of a slurry) is filtered. The solid recovered on the filter may be washed with water. Hot water having a temperature of at least 50° C. may be used.

During step (d), the solid resulting from step (c) is dried using any drying technique known to a person skilled in the art. Spray drying may be usefully employed. The aluminum hydrate is in the form of a dry powder.

The powder may optionally be ground and/or screened so as to obtain a powder of fixed particle size. The ground or unground aluminum hydrate may be in the form of a powder having a mean diameter d50 (median) of between 1.0 and 40.0 μm, more particularly between 3.0 and 30.0 μm, d50 being determined by laser diffraction over a volume distribution.

The aluminum hydrate of the invention may be used to prepare an alumina. The alumina is obtained by calcination of the aluminum hydrate in air. The invention also relates to the process for obtaining an alumina by calcination of the aluminum hydrate of the invention. The calcination temperature is at least 500° C. It may be between 500° C. and 1100° C. The duration of the calcination may be between 30 minutes and 10 hours.

The alumina of the invention has the same porosity characteristics as the aluminum hydrate. After calcination in air at 1100° C. for 3 hours, the alumina may have a specific surface area of at least 80 m$^2$/g, more particularly of at least 100 m$^2$/g. This specific surface area may be between 80 and 120 m$^2$/g. When the alumina comprises at least one additional element as described above, the alumina will be able to have a high thermal resistance. Thus, after calcination in air at 1200° C. for 5 hours, the alumina may have a specific surface area of at least 45 m$^2$/g, more particularly of at least 50 m$^2$/g. This specific surface area may be between 45 and 75 m$^2$/g.

The alumina of the invention may be advantageously used as a catalyst support. This alumina may in particular be used as a support for at least one precious metal for motor vehicle pollution control catalysis. In the case of what is called "three-way" catalysis for gasoline vehicles, an alumina containing at least one additional element will advantageously be able to be used due to its thermal stability at high temperature, typically above 1100° C. The porous alumina obtained according to the invention will advantageously be used under conditions in which a high flow rate of gas passes over the catalyst. The alumina may also be used in pollution-control applications for engines operating under oxidizing conditions (diesel or gasoline). In the case of diesel vehicles which are usually subjected to lower thermal stresses, a pure alumina will be able to be used, with or without additional element.

The aluminum hydrate of the invention may also be used in the preparation of a mixed oxide based on aluminum, on cerium, on zirconium, on lanthanum and optionally on at least one rare-earth metal (REM) other than cerium and lanthanum. REM may, for example, be selected from yttrium, neodymium or praseodymium.

In the mixed oxide, the abovementioned elements Al, Ce, La, REM and Zr are generally present in the form of oxides. The mixed oxide may therefore be defined as a mixture of oxides. However, it is not excluded for these elements to be able to be present at least partly in the form of hydroxides or of oxyhydroxides. The proportions of these elements may be determined using analysis techniques which are customary in laboratories, in particular plasma torch and X-ray fluorescence.

An example of such a mixed oxide may for example comprise the abovementioned elements in the following proportions, expressed as weight of oxide:
   between 20% and 60% of aluminum;
   between 15% and 35% of cerium;
   between 1% and 10% of lanthanum;
   between 0% and 10% for the rare-earth metal other than cerium and lanthanum, on condition that, if the mixed oxide comprises more than one rare-earth metal other than cerium and lanthanum, this proportion applies to each of these rare-earth metals and that the sum of the proportions of these rare-earth metals remains less than 15%;
   between 15% and 50% of zirconium.

The mixed oxide may also comprise hafnium, the proportion of which may be less than or equal to 2.0%, expressed as oxide equivalent relative to the total weight of the mixed oxide. These proportions are given by weight of oxide equivalent relative to the total weight of the mixed oxide. They are given by weight of oxide, unless otherwise indicated. It is considered for these calculations that the cerium oxide is in the form of ceric oxide and that the oxides of the other rare-earth metals are in the form REM$_2$O$_3$, REM denoting the rare-earth metal, with the exception of praseodymium, which is expressed in the form Pr$_6$O$_{11}$. Zirconium oxide and hafnium oxide are in the forms ZrO$_2$ and HfO$_2$. Aluminum is present in the form Al$_2$O$_3$.

The process for obtaining the mixed oxide consists in calcining, in air, a solid precipitate obtained from a dispersion of the aluminum hydrate and of a solution comprising the salts of the elements Ce, Zr, if appropriate La and if appropriate REM.

One particular process (P1) for preparing a mixed oxide of the elements Al, Ce, Zr, La and optionally REM may for example comprise the following steps:
   (i) adding a basic aqueous solution to a dispersion formed from the aluminum hydrate and from an aqueous solution S comprising the salts of cerium, of zirconium, if appropriate of lanthanum and if appropriate of the rare-earth metal other than cerium and lanthanum, so as to precipitate the salts of the constituent elements of the solution S;
   (ii) optionally washing the solid obtained at the end of step (i);
   (iii) calcining the solid obtained at the end of step (i) or (ii) in air at a temperature of between 700° C. and 1200° C.

One particular process (P2) for preparing a mixed oxide of the elements Al, Ce, Zr, La and optionally REM may comprise the following steps:
   (i) adding an aqueous solution S comprising the salts of cerium, of zirconium, if appropriate of lanthanum and if appropriate of the rare-earth metal other than cerium and lanthanum to a dispersion formed from the aluminum hydrate and from a basic aqueous solution, so as to precipitate the salts of the elements of the solution S;
   (ii) optionally washing the solid obtained at the end of step (ii);
   (iii) calcining the solid obtained at the end of step (i) or (ii) in air at a temperature of between 700° C. and 1200° C.

One particular process (P3) for preparing a mixed oxide of the elements Al, Ce, Zr, La and optionally REM may comprise the following steps:
   (i) adding to a basic aqueous solution a dispersion formed from the aluminum hydrate and from an aqueous solution S comprising the salts of cerium, of zirconium, if appropriate of lanthanum and if appropriate of the rare-earth metal other than cerium and lanthanum, so as to precipitate the salts of the solution S;
   (ii) optionally washing the solid obtained at the end of step (ii);
   (iii) calcining the solid obtained at the end of step (i) or (ii) in air at a temperature of between 700° C. and 1200° C.

Step (i), in which the aqueous solution is contacted with the dispersion, is carried out with stirring. Furthermore, in this step, the term "adding" may more particularly denote the operation in which the aqueous solution or the dispersion is introduced into the dispersion or into the aqueous solution, respectively, in particular as vessel heel.

Between steps (ii) and (iii) or (iii) and (iv), an intermediate step may be provided during which the solid is subjected to heating at a temperature of between 70° C. and 150° C. This heating is preferably carried out on the solid dispersed in water.

The salts of the elements Ce, Zr, La and REM may be selected from the group formed by the nitrates, chlorides and acetates. It will be noted that, in the case where REM represents lanthanum and/or praseodymium, these elements may be provided in whole or in part by the aluminum hydrate. The basic aqueous solution may for example be an aqueous ammonia solution. An example of such a process for preparing a mixed oxide is given in U.S. Pat. No. 9,289,751, and also in the applications WO 13007272 and WO 14201094.

The aluminum hydrate makes it possible to obtain a homogeneous dispersion. This makes it possible to obtain a mixed oxide having good properties, in particular of thermal resistance. The mixed oxide may thus have a BET specific surface area of greater than 30 m$^2$/g after calcination in air at 1100° C. for 5 h.

The invention also relates to a dispersion of the aluminum hydrate in an aqueous, in particular acidic, solution comprising the salts of cerium, of zirconium, of lanthanum and optionally of the rare-earth metal other than cerium and lanthanum. The invention also relates to a dispersion of the aluminum hydrate in a basic aqueous solution, in particular an aqueous ammonia solution.

EXAMPLES

For the porosity or specific surface area measurements, the samples are pretreated at 200° C. for 2 h to eliminate the volatile surface species (such as for example $H_2O$, etc.).

The specific surface area is determined automatically using a Tristar II 3020 device from Micromeritics in accordance with the instructions recommended by the manufacturer.

The porosity measurements from which the pore volumes are deduced are determined in an automated manner using a Tristar II 3020 device from Micromeritics. The Barrett, Joyner and Halenda (BJH) method with the Harkins-Jura law is used. The analysis of the results is carried out on the desorption curve.

The X-ray diffraction analyses are obtained with a copper source (CuKα1, λ=1.5406 angstroms). Use was made of an X'Pert Pro goniometer from Panalytical equipped with a copper source, a spinner sample holder and an X'Celerator 1D detector having an angular width of 2.122°. The device is equipped with a nickel filter at the front and with programmable slits so as to illuminate a constant square surface area of 10 mm side length.

Example 1

Preparation of an Aluminum Hydrate According to the Invention with 6.2% Lanthanum (93.8% $Al_2O_3$-6.2% $La_2O_3$)

In a stirred tank, a solution (A) is prepared by introducing 34.7 kg of deionized water, 10.95 kg of an aluminum sulfate solution having a concentration of 8.31% by weight of alumina ($Al_2O_3$), 1.43 kg of a lanthanum nitrate solution having a concentration of 26.9% by weight of $La_2O_3$ and 4.97 kg of a 68% by weight nitric acid solution. The solution (B) is a sodium aluminate solution having a concentration of 24.9% by weight of alumina ($Al_2O_3$).

71 kg of deionized water are introduced into a stirred reactor (250 rpm; stirrer with four blades inclined at 45°). The reactor is then heated until a temperature of 65° C. is reached. This temperature is maintained throughout the reaction. A 69% nitric acid solution is introduced into the stirred reactor until a pH of 3 is reached.

In a step (a), the solution (A) and the solution (B) are simultaneously introduced into the stirred reactor through introduction tubes close to the stirrer. The solution (A) is introduced with a flow rate of 1.05 kg/min. The solution (B) is introduced at a flow rate which makes it possible to achieve a pH of 5 in 3 minutes.

The flow rate of the solution (A) remains constant at 1.05 kg/min and the flow rate of the solution (B) is regulated so as to maintain the pH at a value of 5.1 for 46 minutes.

In a step (b), the introduction of the solution (A) is stopped and the solution (B) continues to be added until a pH of 10 is reached in 15 minutes.

In step (c), the reaction slurry is then poured over a vacuum filter. At the end of the filtration, the cake is washed with deionized water at 60° C. The cake has a solids content of 11% by weight of oxide ($Al_2O_3$—$La_2O_3$). The cake is then redispersed in deionized water to obtain a suspension having a concentration close to 8% by weight of oxide ($Al_2O_3$—$La_2O_3$).

In step (d), the suspension is atomized to obtain a dry lanthanum-doped aluminum hydrate powder. The loss on ignition of the powder is obtained by the loss in weight after calcination at 950° C.—2 hours. It is 31.2% by weight. The aluminum hydrate powder contains an equivalent of 64.5% by weight of $Al_2O_3$ and 4.2% by weight of $La_2O_3$. This powder has a BET surface area of 344 m$^2$/g.

Example 2

Preparation of an Alumina Having the Composition 93.8% $Al_2O_3$-6.2% $La_2O_3$

The powder of example 1 is calcined in air at 940° C. for 2 hours to obtain a lanthanum-doped alumina powder. The temperature is increased at a rate of 2.5° C./min.

Example 3

Preparation of an Aluminum Hydrate with 6.2% La (93.8% $Al_2O_3$-6.2% $La_2O_3$)

In a stirred tank, a solution (A) is prepared by introducing 34.7 kg of deionized water, 10.95 kg of an aluminum sulfate solution having a concentration of 8.31% by weight of alumina ($Al_2O_3$), 1.43 kg of a lanthanum nitrate solution having a concentration of 26.9% by weight of $La_2O_3$ and 4.96 kg of a 68% nitric acid solution. The solution (B) is a sodium aluminate solution having a concentration of 24.9% by weight of alumina.

71 kg of deionized water are introduced into a stirred reactor (250 rpm; stirrer with four blades inclined at 45°). The reactor is then heated until a temperature of 65° C. is reached. This temperature is maintained throughout the reaction. A 69% nitric acid solution is introduced into the stirred reactor until a pH of 3 is reached.

In a step (a), the solution (A) and the solution (B) are simultaneously introduced into the stirred reactor through introduction tubes close to the stirrer. The solution (A) is introduced with a flow rate of 1.05 kg/min. The solution (B) is introduced at a flow rate which makes it possible to achieve a pH of 4.4 in 3 minutes. The flow rate of the solution (A) remains constant at 1.05 kg/min and the flow rate of the solution (B) is regulated so as to maintain the pH at a value of 4.4 for 46 minutes.

In a step (b), the introduction of the solution (A) is stopped and the solution (B) continues to be added until a pH of 10 is reached in 15 minutes.

In a step (c), the reaction slurry is then poured over a vacuum filter. At the end of the filtration, the cake is washed with deionized water at 60° C. The cake has a solids content of 13% by weight of oxide ($Al_2O_3$—$La_2O_3$). The cake is then redispersed in deionized water to obtain a suspension having a concentration close to 8% by weight of oxide ($Al_2O_3$—$La_2O_3$).

In a step (d), the suspension is atomized to obtain a lanthanum-doped aluminum hydrate powder. The loss on ignition of the powder is obtained by the loss in weight after calcination at 950° C.—2 hours. It is 38.5% by weight. The aluminum hydrate powder contains an equivalent of 57.8% by weight of $Al_2O_3$ and 3.8% by weight of $La_2O_3$. This powder has a BET surface area of 259 $m^2/g$.

Example 4

Preparation of an Alumina Having the Composition 93.8% $Al_2O_3$-6.2% $La_2O_3$

The powder of example 3 is then calcined at 940° C. in air for 2 hours to obtain a lanthanum-doped alumina powder. The temperature is increased at a rate of 2.5° C./min.

The characterizations of the atomized powders and of the calcined powders are recorded in tables I and II.

Example 5

Use of the Aluminum Hydrate of Example 1 in the Preparation of a Mixed Oxide Having the Composition $Al_2O_3$ (30%)-$ZrO_2$ (35%)-$CeO_2$ (27%)-$La_2O_3$ (4%)-$Y_2O_3$ (4%) (% by Weight)

A solution based on the nitrates of the precursors is prepared by introducing into a tank, stirred with the aid of a stirrer with four blades inclined at 45°, 357 g of water, 114 g of a zirconyl nitrate solution ($[ZrO_2]$=260 g/l; density 1.406), 56 g of a $Ce^{III}$ nitrate solution ($[CeO_2]$=496 g/l; density 1.714), 4.4 g of a lanthanum nitrate solution ($[La_2O_3]$=472 g/l; density 1.711) and 16 g of an yttrium nitrate solution ($[Y_2O_3]$=208.5 g/l; density 1.392).

Next, 2.3 g of 69% by weight nitric acid are added to the solution obtained, to obtain the solution of precursors. 28 g of aluminum hydrate of example 1 containing an equivalent of 64.5% by weight of alumina (18 g of $Al_2O_3$) and 4.2% by weight of $La_2O_3$ (1.17 g) are added to this solution, by spatula, still while stirring. The mixture is left to stir until the precursor mixture is obtained in the form of a homogeneous dispersion. Next, 5.3 g of a 9.8 mol/l aqueous hydrogen peroxide solution are added. The precursor mixer is kept stirring.

The precursor mixture is introduced in 60 min into a reactor stirred by a stirrer with four blades inclined at 45° (575 rpm), containing 500 ml of a 2 mol/l aqueous ammonia solution at ambient temperature.

At the end of the addition of the precursor mixture, the mixture is heated to a temperature of 95° C. and maintained at this temperature for 30 min. The mixture is then cooled to a temperature below 40° C. 12 g of lauric acid are added to this cooled mixture while stirring at 650 rpm. This stirring is maintained for 30 min.

The mixture is filtered under vacuum, then the cake is washed with 720 g of aqueous ammonia solution of pH=9. The wet cake obtained is then introduced into a muffle furnace. The temperature of the furnace is raised at a rate of 4° C./min until 950° C. is reached; this temperature is then maintained for 4 h. At the end of this calcination in air, the mixed oxide is obtained. The mixed oxide recovered is then ground using a mortar.

Specific surface areas of the mixed oxide after calcination in air for 4 h:

950° C.: 82 $m^2/g$

1000° C.: 68 $m^2/g$

1100° C.: 40 $m^2/g$

Example 6

Use of the Aluminum Hydrate of Example 2 in the Preparation of a Mixed Oxide Having the Composition $Al_2O_3$ (30%)-$ZrO_2$ (35%)-$CeO_2$ (27%)-$La_2O_3$ (4%)-$Y_2O_3$ (4%) (% by Weight)

A solution based on the nitrates of the precursors is prepared by introducing into a tank, stirred with the aid of a stirrer with four blades inclined at 45°, 357 g of water, 114 g of a zirconyl nitrate solution ($[ZrO_2]$=260 g/l; density 1.406), 56 g of a $Ce^{III}$ nitrate solution ($[CeO_2]$=496 g/l; density 1.714), 4.4 g of a lanthanum nitrate solution ($[La_2O_3]$=472 g/l; density 1.711) and 16 g of an yttrium nitrate solution ($[Y_2O_3]$=208.5 g/l; density 1.392).

Next, 2.3 g of 69% by weight nitric acid are added to the solution obtained, in order to obtain the solution of precursors. 31.1 g of aluminum hydrate of example 3 containing an equivalent of 57.8% by weight of alumina (18 g of $Al_2O_3$) and 3.8% by weight of $La_2O_3$ (1.18 g) are added to this solution, by spatula, still while stirring. The mixture is left to stir until the precursor mixture is obtained in the form of a homogeneous dispersion. Next, 5.3 g of a 9.8 mol/l aqueous hydrogen peroxide solution are added. The precursor mixer is kept stirring.

500 ml of a 2 mol/l aqueous ammonia solution are introduced into a stirred reactor (600 rpm: stirrer with four blades inclined at 45°). The precursor mixture is introduced in 60 min into the stirred reactor. The process is carried out at ambient temperature. At the end of the addition of the precursor mixture, the reaction medium is heated to a temperature of 95° C. and maintained at this temperature for 30 min. The reaction medium is then cooled to a temperature below 40° C. 12 g of lauric acid are added to this cooled mixture while stirring at 500 rpm. This stirring is maintained for 30 min.

The reaction medium is filtered under vacuum, then the cake is washed with 1 l of aqueous ammonia solution (pH=9). The wet cake obtained is then introduced into a muffle furnace. The temperature of the furnace is raised at a rate of 4° C./min up to 950° C.; this temperature is maintained for 4 h. At the end of this calcination in air, the mixed oxide is obtained. The mixed oxide recovered is then ground using a mortar.

Specific surface areas of the mixed oxide after calcination in air for 4 h:

950° C.: 79 $m^2/g$

1000° C.: 66 $m^2/g$

1100° C.: 41 $m^2/g$

TABLE I characterizations of the aluminum hydrates (atomized powders)

| | BET specific surface area (m²/g) | | X-ray analysis | | pore volumes after calcination in air at 900° C. - 2 h | | |
|---|---|---|---|---|---|---|---|
| | at the end of step (d) | after calcination in air at 900° C. - 2 h | [020] XRD crystallite size (nm) | XRD crystallinity [120] peak | VPT-N$_2$ (ml/g) | VP$_{20\,nm}$-N$_2$/ VPT-N$_2$ (%) | VP$_{40\text{-}100\,nm}$-N$_2$/ VPT-N$_2$ (%) |
| Ex. 1 (inv.) | 344 | 181 | 2.8 | 47% | 1.09 | 36% | 32% |
| Ex. 3 (inv.) | 259 | 162 | 2.8 | 44% | 0.70 | 57% | 21% |
| reference * | 134 | 110 | 13.0 | 100% | 0.99 | 12% | 2% |

* product corresponding to example B1 of the application US 2013/017947

TABLE II characterizations of the aluminas (aluminum hydrate powders calcined in air at 940° C. - 2 h)

| | BET specific surface area (m²/g) | VPT (ml/g) | BET specific surface area 1100° C. - 3 h (m²/g) | BET specific surface area 1200° C. - 5 h (m²/g) |
|---|---|---|---|---|
| Ex. 2 (inv.) | 179 | 1.01 | 112 | 71 |
| Ex. 4 (inv.) | 120 | 0.76 | 88 | 49 |

The invention claimed is:

1. An aluminum hydrate identified by X-ray diffraction as including boehmite, which may optionally comprise at least one additional element selected from lanthanum, praseodymium or a mixture of the two elements, characterized in that, after having been calcined in air at a temperature of 900° C. for 2 h, it has:
   a pore volume in the domain of the pores having a size of less than or equal to 20 nm (denoted by VP$_{20nm}$-N$_2$) such that VP$_{20nm}$-N$_2$:
      is greater than or equal to 30%×VPT-N$_2$;
      is less than or equal to 60%×VPT-N$_2$; and
   a pore volume in the domain of the pores having a size of between 40 and 100 nm (denoted by VP$_{40\text{-}100nm}$-N$_2$) such that VP$_{40\text{-}100nm}$-N$_2$ is greater than or equal to 20%×VPT-N$_2$;
   VPT-N$_2$ denoting the total pore volume of the aluminum hydrate after calcination in air at 900° C. for 2 hours and being between 0.65 and 1.15 mL/g;
   the pore volumes being determined by the nitrogen porosimetry technique.

2. The aluminum hydrate as claimed in claim 1, characterized in that it is identifiable by X-ray diffraction in the form of a mixture of a boehmite and of an amorphous phase.

3. The aluminum hydrate as claimed in claim 1, characterized by a percentage of crystalline phase which is less than or equal to 60%.

4. The aluminum hydrate as claimed in claim 1, characterized in that the boehmite has a mean size of the crystallites of at most 6.0 nm.

5. The aluminum hydrate as claimed in claim 1, characterized in that, after having been calcined in air at 900° C. for 2h, it has a (BET) specific surface area of at least 130 m²/g.

6. The aluminum hydrate as claimed in claim 1, characterized in that, after having first been calcined in air at 940° C. for 2h, then calcined in air at 1100° C. for 3h, it has a (BET) specific surface area of at least 80 m²/g.

7. The aluminum hydrate as claimed in claim 1, characterized in that it comprises an additional element selected from the group formed by lanthanum, praseodymium or a mixture of the two elements and in that, after having first been calcined in air at 940° C. for 2h, then calcined in air at 1200° C. for 5h, it has a (BET) specific surface area of at least 45 m²/g.

8. The aluminum hydrate of claim 1, further comprising residual sulfate, the content of residual sulfate being less than or equal to 0.50% by weight.

9. The aluminum hydrate of claim 1, further comprising residual sodium, the content of residual sodium being less than or equal to 0.15% by weight.

10. The aluminum hydrate as claimed in claim 1, characterized in that the proportion of the additional element or the total proportion of the additional elements is by weight between 0% and 15%.

11. A process for preparing the aluminum hydrate as claimed in claim 1, the process comprising the following steps:
   (a) introducing the following into a stirred tank containing an aqueous nitric acid solution:
      an aqueous solution (A) comprising aluminum sulfate, optionally the additional element(s) in nitrate form, and nitric acid;
      an aqueous sodium aluminate solution (B);
   the aqueous solution (A) being introduced continuously throughout step (a) and the flow rate of introduction of the solution (B) being regulated so that the mean pH of the reaction mixture is equal to a target value of between 4.0 and 6.0;
   (b) when the entire aqueous solution (A) has been introduced, continuing the introduction of the aqueous solution (B) until a target pH of between 8.0 and 10.5 is reached;
   (c) filtering the reaction mixture to recover the solid and washing said solid with water;
   (d) drying the solid resulting from step (c) to form the aluminum hydrate of claim 1.

12. The process as claimed in claim 11, wherein the aluminum hydrate powder obtained at the end of step (d) is ground and/or screened.

13. A process for preparing alumina, the process consisting of calcining the aluminum hydrate as claimed in claim 1.

14. A process for preparing a mixed oxide comprising aluminum, cerium, zirconium, lanthanum and optionally at least one rare-earth metal (REM) other than cerium and lanthanum, the process consisting of calcining, in air, a solid precipitate obtained from a dispersion of the aluminum hydrate as claimed in claim 1 and an aqueous solution comprising the salts of the elements cerium, zirconium, lanthanum and optionally at least one rare-earth metal (REM) other than cerium and lanthanum.

15. A process for preparing a mixed oxide comprising aluminum, cerium, zirconium, lanthanum and optionally at least one rare-earth metal (REM) other than cerium and lanthanum, the process comprising:
- (i-a) adding a basic aqueous solution to a dispersion formed from the aluminum hydrate as claimed in claim 1 and an aqueous solution S comprising the salts of cerium, zirconium, lanthanum and optionally at least one rare-earth metal (REM) other than cerium and lanthanum, to precipitate a solid; or
- (i-b) adding an aqueous solution S comprising the salts of cerium, zirconium, lanthanum and optionally at least one rare-earth metal (REM) other than cerium and lanthanum to a dispersion formed from the aluminum hydrate as claimed in claim 1 and a basic aqueous solution to precipitate a solid; or
- (i-c) adding to a basic aqueous solution a dispersion formed from the aluminum hydrate as claimed in claim 1 and an aqueous solution S comprising the salts of cerium, zirconium, lanthanum and optionally at least one rare-earth metal (REM) other than cerium and lanthanum to precipitate a solid;
- (ii) optionally washing the solid obtained at the end of step (i);
- (iii) calcining the solid obtained at the end of step (i) or (ii) in air at a temperature of between 700° C. and 1200° C. to obtain the mixed oxide.

16. The process as claimed in claim 15, comprising an additional step between steps (ii) and (iii) during which the solid is subjected to heating at a temperature of between 70° C. and 150° C.

17. The process as claimed in claim 14, wherein the mixed oxide comprises hafnium.

18. The process as claimed in claim 17, for which the proportion of hafnium is less than or equal to 2.0%, expressed as oxide equivalent relative to the total weight of the mixed oxide.

19. A dispersion of the aluminum hydrate as claimed in claim 1 in an aqueous solution comprising the salts of cerium, zirconium, lanthanum and optionally at least one rare-earth metal (REM) other than cerium and lanthanum.

20. A dispersion of the aluminum hydrate as claimed in claim 1 in a basic aqueous solution.

* * * * *